United States Patent [19]

Fournier et al.

[11] Patent Number: 5,638,269
[45] Date of Patent: Jun. 10, 1997

[54] SEISMIC TRACE ANALYSIS METHOD UTILIZING A STATISTICAL CALIBRATION TECHNIQUE FOR DEDUCING GEOLOGIC PROPERTIES

[75] Inventors: Frédérique Fournier, Cormeilles en Parisis; Caroline Joseph, Fourqueux, both of France

[73] Assignee: Institut Francais du Petrole, Rueil Malmaison, France

[21] Appl. No.: 436,326

[22] PCT Filed: Sep. 19, 1994

[86] PCT No.: PCT/FR94/01087

§ 371 Date: May 19, 1995

§ 102(e) Date: May 19, 1995

[87] PCT Pub. No.: WO95/08781

PCT Pub. Date: Mar. 30, 1995

[30] Foreign Application Priority Data

Sep. 21, 1993 [FR] France .................................. 93 11313

[51] Int. Cl.$^6$ ..................................................... G06F 19/00
[52] U.S. Cl. ............................................................ 364/422
[58] Field of Search ..................................... 364/421, 422

[56] References Cited

U.S. PATENT DOCUMENTS 4,293,309 10/1981 Miller .
4,817,062 3/1989 De Buyl et al. .
4,926,394 5/1990 Doyen .

OTHER PUBLICATIONS

P.M. Doyen, "Porosity from seismic data: A geostatistical approach", Geophysics, vol. 53, No. 10, Oct. 1988, pp. 1263–1275.

*Primary Examiner*—Donald E. McElheny, Jr.
*Attorney, Agent, or Firm*—Antonelli, Terry, Stout & Kraus, LLP

[57] ABSTRACT

The method applies to an underground formation concerning which one has geologic data obtained by coring or logging in wells ($W_1$–$W_k$) crossing the formation and seismic data which have been obtained by means of a reflection survey of the 3D type. It is based on a statistical calibration technique with a statistical relationship obtained by bringing together the local geologic data (measured in wells) and seismic attributes read on seismic traces ($RW_1$–$RW_k$) obtained in the immediate neighborhood of each well. This calibration allows an empirical relation to be obtained and applied to all the seismic traces of the field in order to infer the associated geologic characteristics therefrom, by taking advantage of the much denser spatial coverage allowed by seismic prospecting.

15 Claims, 11 Drawing Sheets

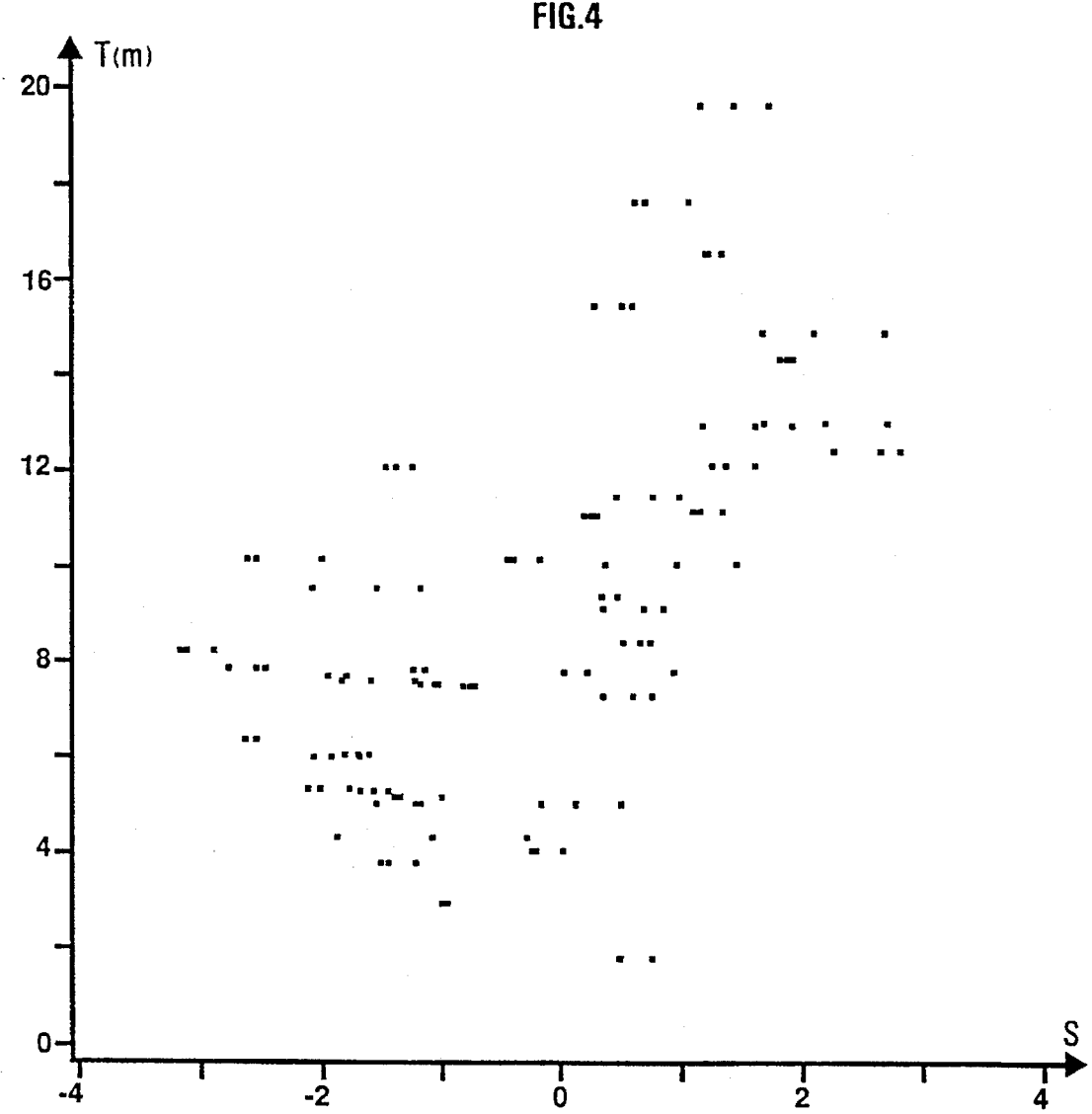

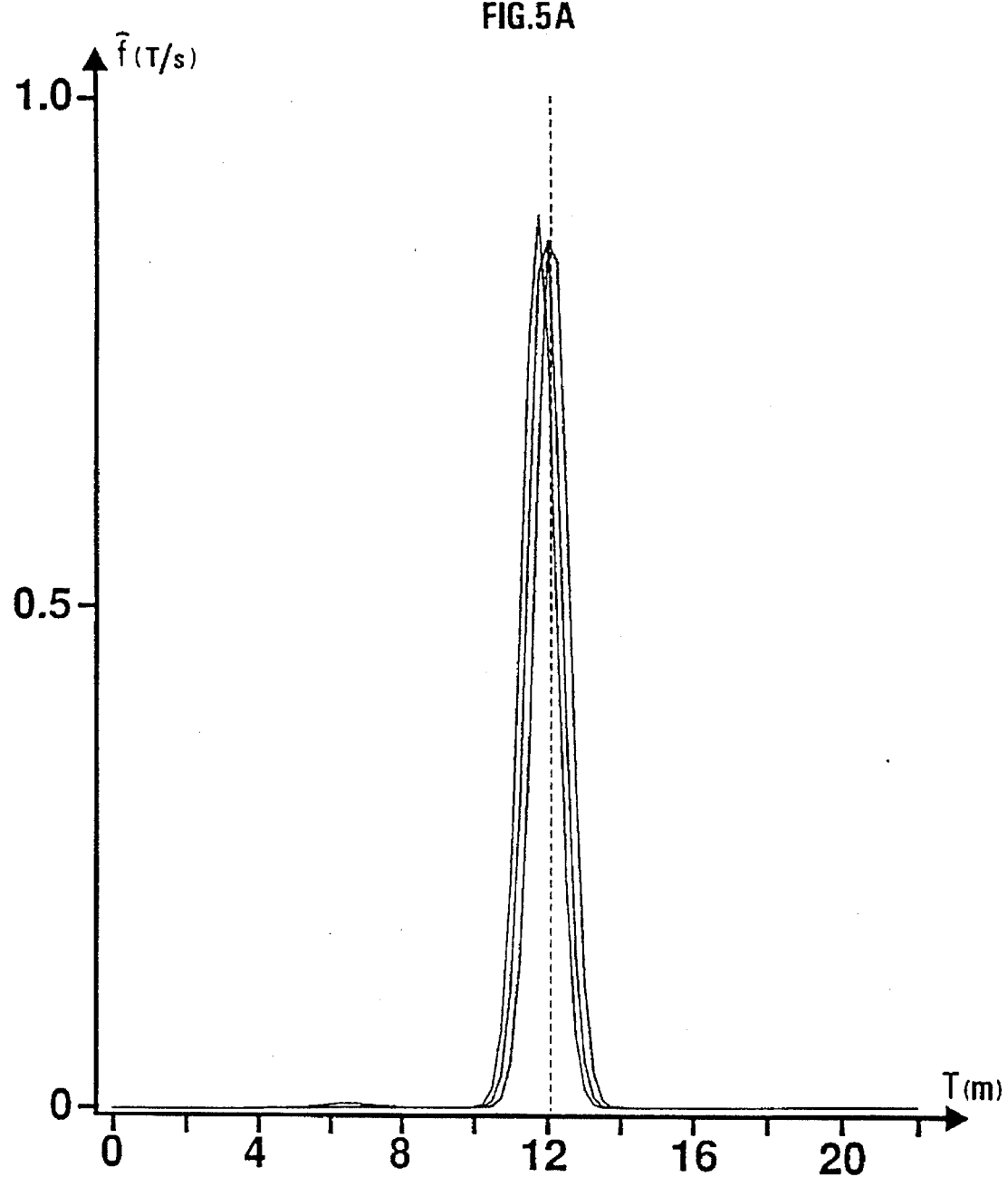

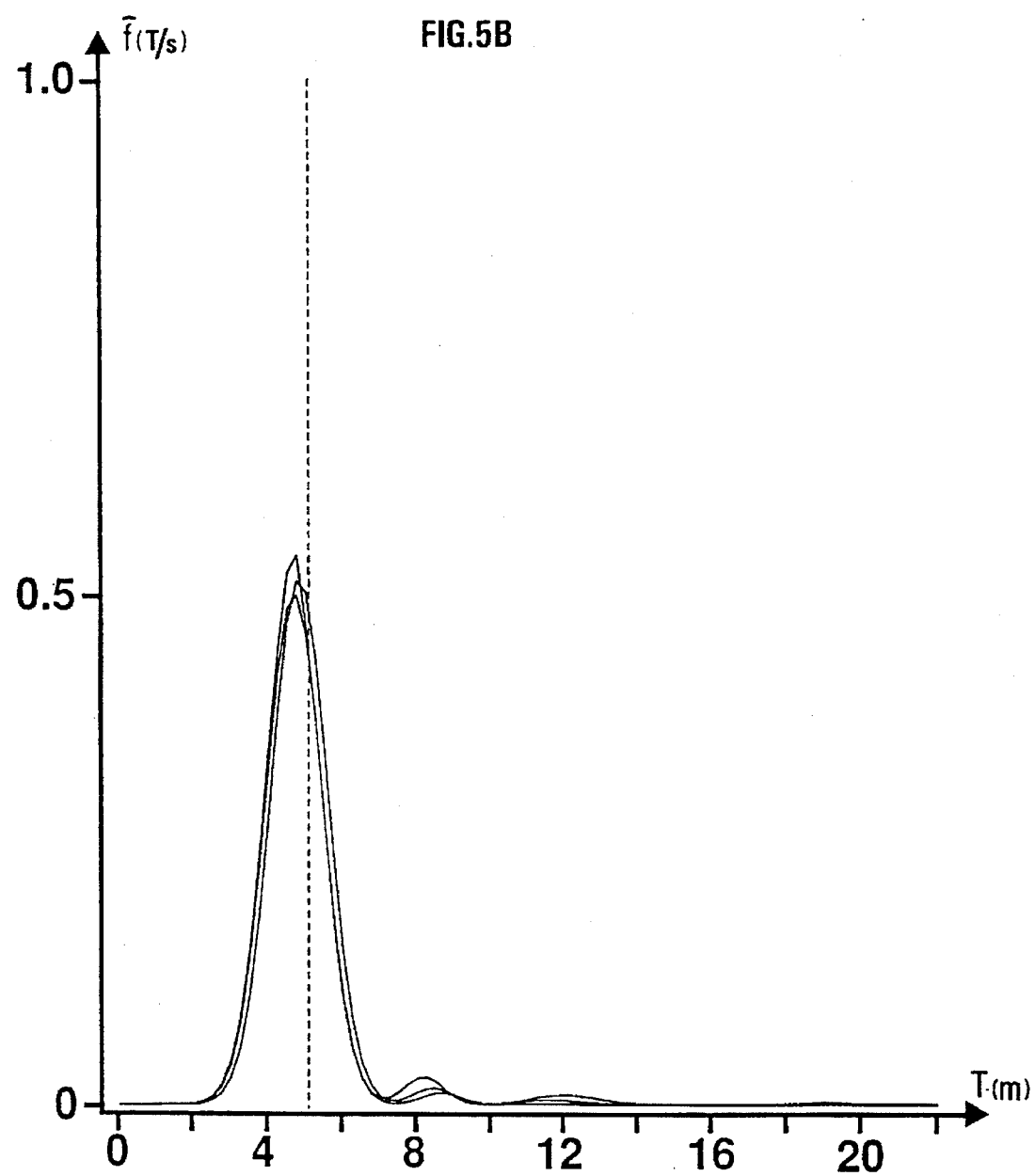

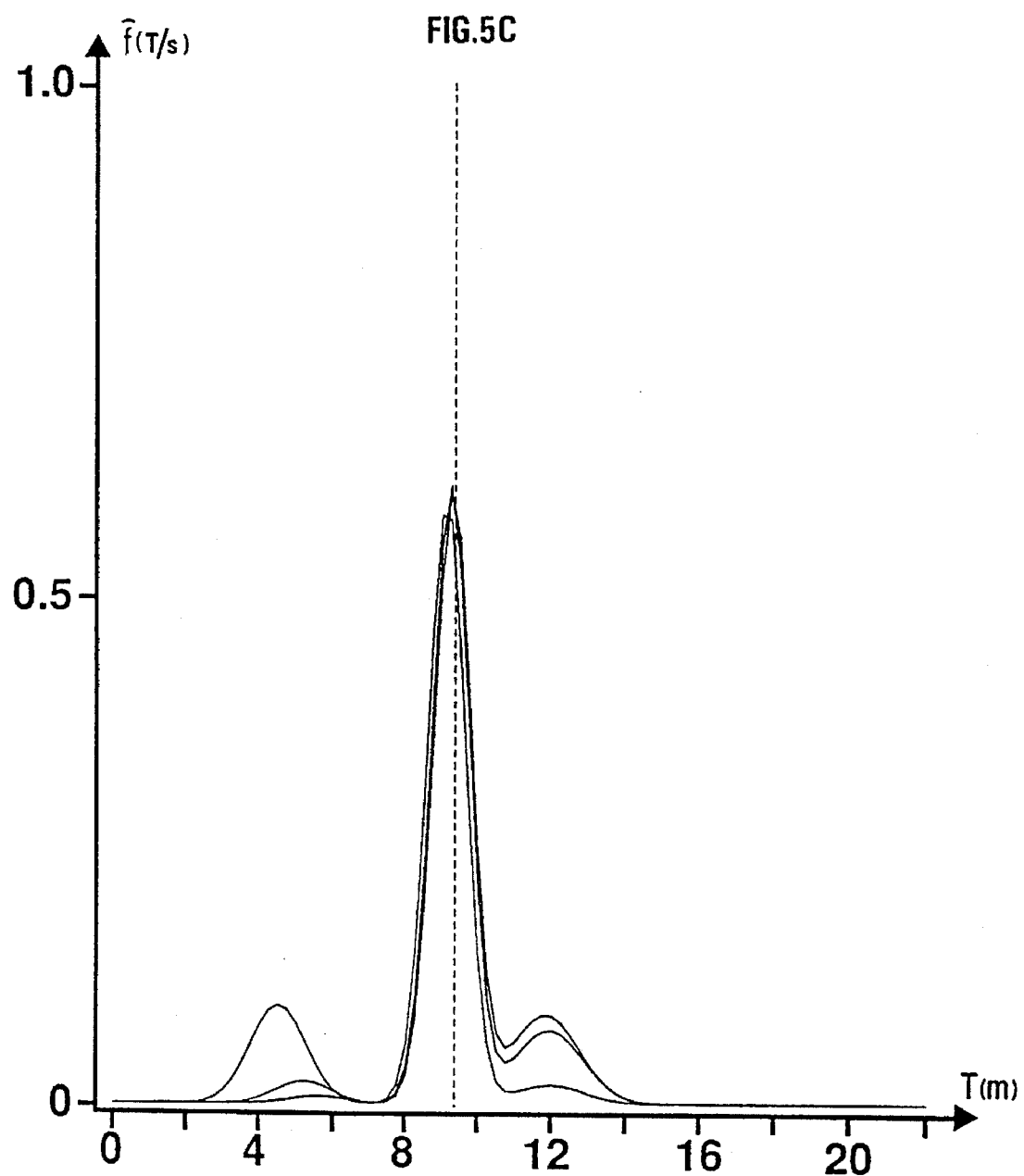

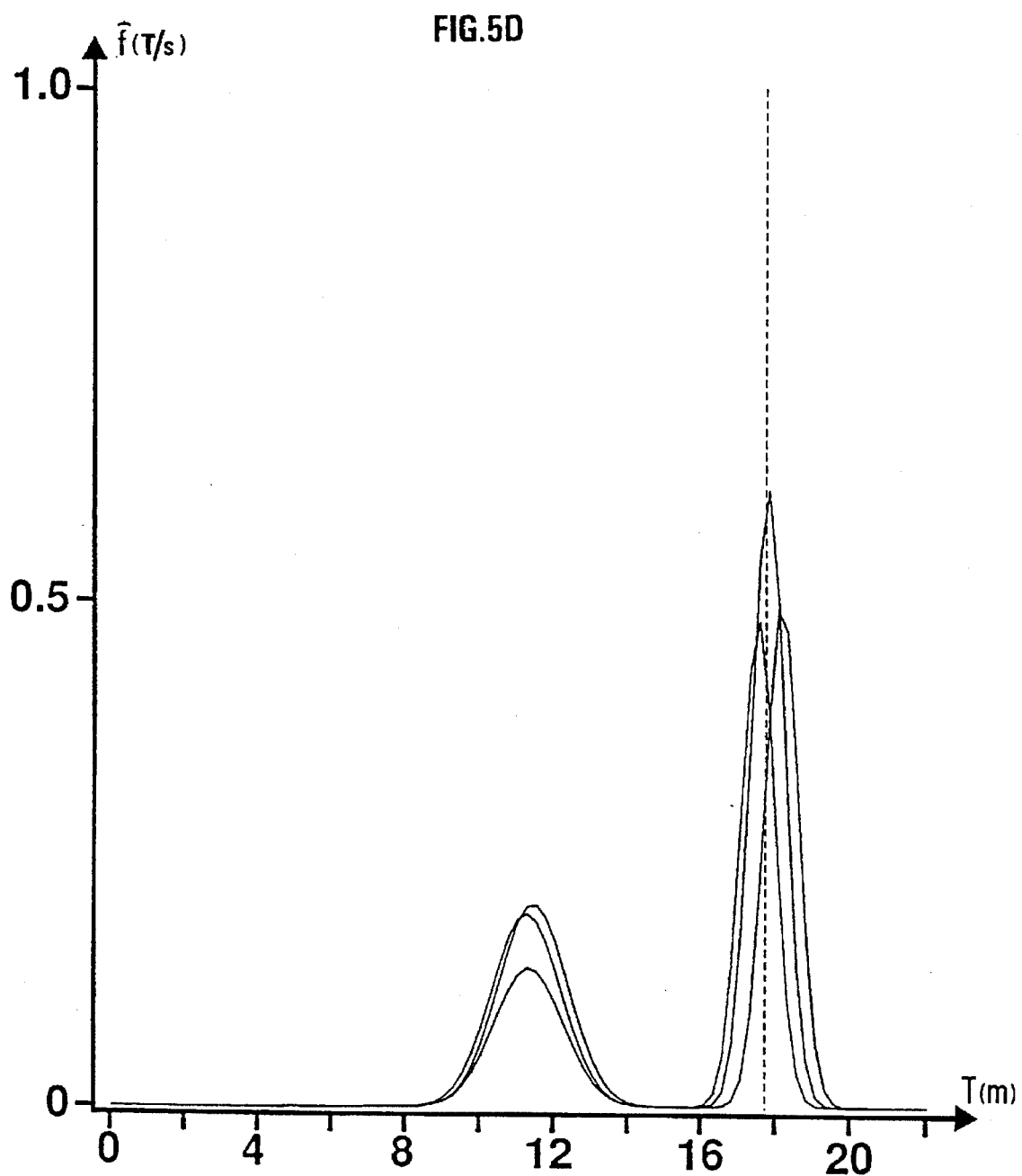

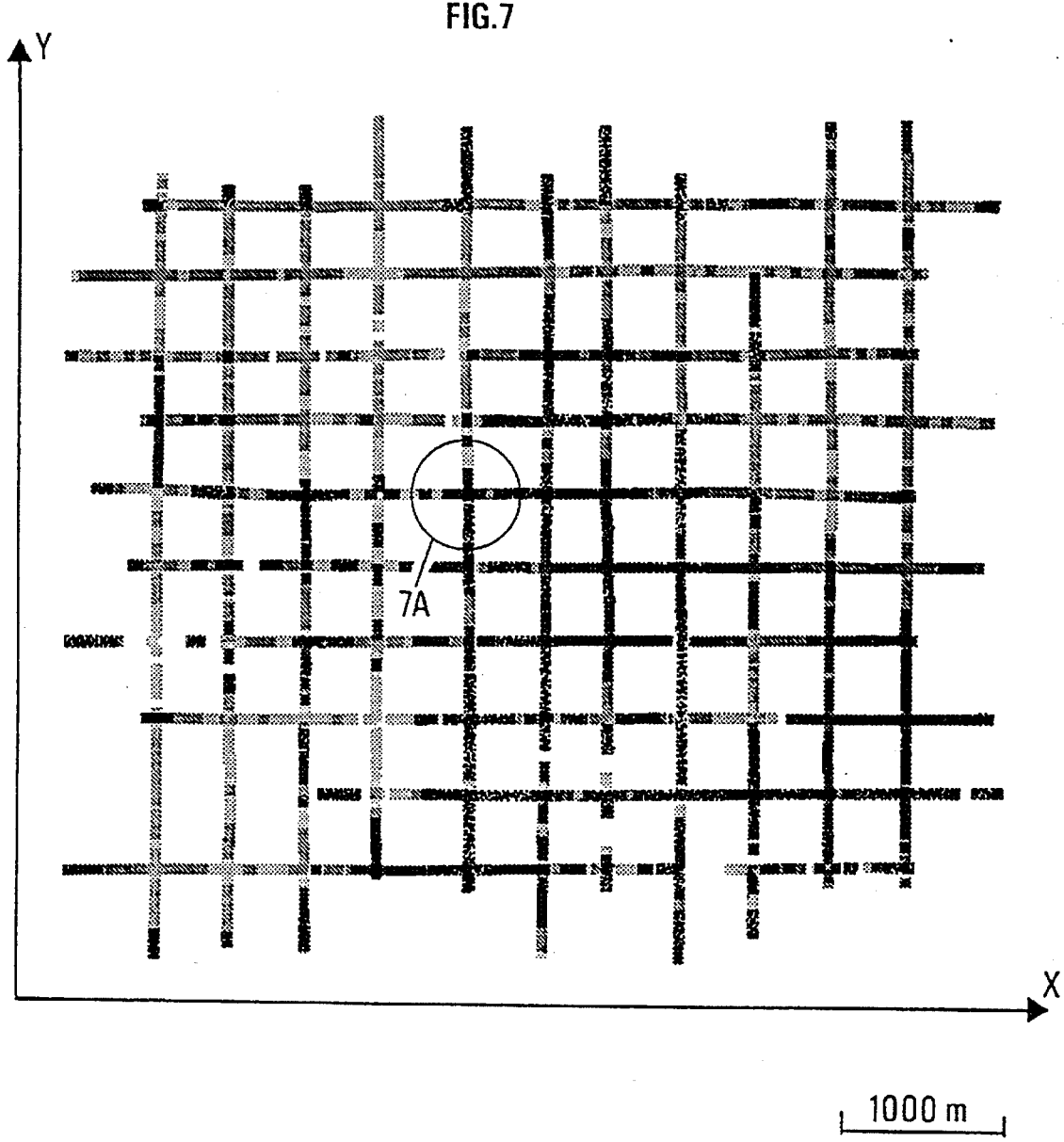

SEISMIC TRACE ANALYSIS METHOD UTILIZING A STATISTICAL CALIBRATION TECHNIQUE FOR DEDUCING GEOLOGIC PROPERTIES

BACKGROUND OF THE INVENTION

1. Field of the Invention

The present invention relates to a method of seismic trace analysis for extracting therefrom geologic information relative to an underground formation such as an oil reservoir.

2. Description of the Prior Art

Statistical calibration techniques applied to seismic traces in order to extract therefrom geologic parameters at the level of a reservoir have already been described by Doyen, 1988, Porosity from seismic data: A Geostatistical Approach, Geophysics, 53, No. 10, 1263–1275, and by Fournier and Derain, 1992, Seismic Data Integration in Reservoir Simulations through a Multivariate Statistical Calibration Approach, 62nd Ann. Intern. Mtg., Soc. Expl. Geophys., Expanded Abstracts, 95–98.

The calibration techniques used must be able to be easily adapted in case several geologic and seismic parameters are considered (multivariable aspect) and also to account for possibly non linear relations between the geologic and the seismic parameters. These techniques must not be limited by too many underlying probabilistic hypotheses, and they also must provide a proven quantification of the uncertainties linked to the values predicted by the calibration operation.

The known techniques for the geologic calibration of seismic data do not always fulfil these objectives.

SUMMARY OF THE INVENTION

The method according to the invention allows to bring together data which have been obtained through the seismic exploration of the formation and geological data resulting from measurements obtained by using measuring sondes into one or several wellbores crossing the reservoir zone. The method therefore utilizes a statistical calibration between the geologic parameters at the level of the reservoir and the characteristics of the seismic measurements obtained in the neighborhood of the wells. The main purpose of this statistical calibration is to establish an empirical relation between the seismic characteristics and the geologic properties of the reservoir at the level of the wells, a relation which is thereafter applied to the seismic traces far from the wells in order to assess the geologic characteristics of the reservoir.

The object of the method according to the invention is thus to improve knowledge of the reservoir between the wells from surface seismic data, which often display a much higher spatial coverage density than that of the wells.

The results obtained are useful in the early stages of the reservoir life when looking for the best sites for drilling wells (assessment phase or development phase beginning). At a later stage, the results are also useful to impose constraints on the reservoir model which has been established to represent the reservoir formation in question.

The method according to the invention allows, by respecting the requirements defined above, to predict (by carrying out an estimation, or by carrying out and a simulation in order to represent their uncertainties) geologic parameters of an underground formation such as an oil reservoir, from geologic information obtained through measurings or analyses performed in one or several wellbores crossing the formation and from a collection of seismic traces. This collection is obtained through the direct seismic exploration of the formation or it may consist of seismic traces calculated from data obtained in the wells for example. It particularly comprises a set of traces consisting of real traces obtained in the immediate neighbourhood of the wells (adjacent traces) or of calculated traces also corresponding to this neighbourhood. The calibration population defined hereafter is selected from this set of traces.

The method comprises the following stages: an analysis interval (in time or in depth) is defined on the seismic traces at the level of the underground formation, compatible with the geometric configuration of the formation, the seismic trace portions are characterized, within this analysis interval, by a set of p attributes, a certain number q of geologic parameters is deduced from said available geologic information (obtained in the wells), and a calibration population is formed, which includes points with which the p attributes relative to the seismic traces of the set of traces (adjacent to the wells) and the q geologic parameters are associated.

The method is characterized in that:
  a statistical calibration is performed on the population of points in a (p+q) dimensional space of representation, by seeking an approximation to the multivariable density function relative to this population so as to establish a relation between the geologic parameters and the seismic attributes, and
  this relation is applied to the seismic traces of the collection, other than those of the set of adjacent traces (close to the wells), so as to predict the corresponding q geologic parameters associated with the seismic attributes of these other traces (i.e. traces at a further distance from the wells), as well as the uncertainties about the geologic parameters predicted.

This statistical calibration comprises for example determination of an optimum approximation to the multivariable probability density function of the calibration population by a finite sum of multivariable probability densities, belonging to a determined family of probability laws, and use of this approximation for calibration purposes. A family of Gaussian laws can for example be selected to determine this optimum approximation.

When the formation is for example a reservoir containing petroleum effluents, the analysis interval is delimited by picking the top and the base of the reservoir on the seismic traces of the collection.

The seismic attributes are obtained for example from the amplitudes of each portion of seismic trace of the collection of traces or from the amplitude of the analytic signal, or by determining the amplitude spectrum of the trace portions.

The stage of determination of the q geologic parameters comprises for example an analysis of samples taken in the wells or an analysis of logs recorded by means of tools put down in the wells. The seismic traces used can be, as the case may be, obtained by seismic exploration of the formation, or synthetized from well data, real or calculated themselves.

The average porosity of the geologic samples at the level of the reservoir may be selected for example as a geologic parameter.

The method according to the invention, applied for calibration purposes, has the advantage of being well-suited to multiple variable cases, and it allows dealing with problems where non-linear relations exist between the geologic parameters and the seismic attributes. It also provides quantification of the uncertainties since the probability density function is totally known. This method can be completely non-parametric. It is also efficient as for the calculating time required, even in the case where the number of parameters and attributes taken into account is high.

BRIEF DESCRIPTION OF THE DRAWINGS

Other features and advantages of the method will be clear from reading the description hereafter, with reference to the accompanying drawings in which:

FIG. 4 shows, for the formation tested, a diagram of the sandstone thicknesses T in the formation as a function of a seismic attribute S which is a particular linear combination of the amplitudes of the traces.

FIGS. 5A to 5D show, at the level of the formation surveyed and of four particular wells, the conditional distribution $\hat{f}(T/s)$ of the thickness T of sandstones, knowing the seismic data S, as well as the actual sandstone thicknesses measured in these wells (in dotted line in the figures) for a purpose of comparison.

FIGS. 7 and 7A respectively show, with different scales, the distribution of the sandstone thicknesses predicted by applying the method to the formation tested.

DESCRIPTION OF THE PREFERRED EMBODIMENTS

Figure 1:
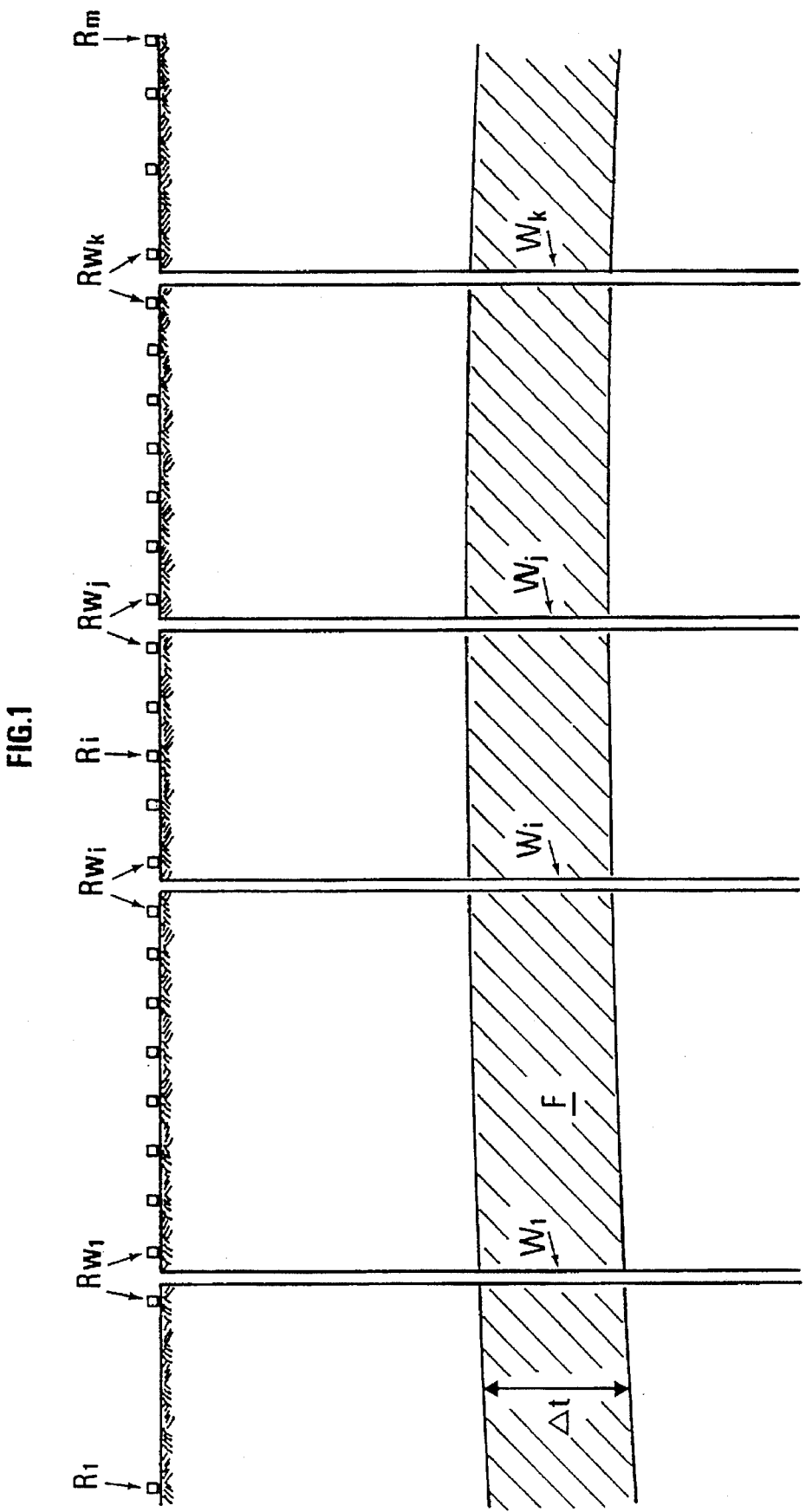
FIG. 1 diagrammatically shows an underground formation crossed through by wells.

The statistical calibration method according to the invention applies to an underground formation F (FIG. 1) generally crossed through by several wells $W_1 \ldots W_i \ldots W_j \ldots W_k$, such as a reservoir containing petroleum effluents. Data of geologic and seismic nature have been gathered in this formation.

An analysis of the samples taken in the wells crossing the formation or measurings achieved by using logging tools into the wells have allowed a certain number q of local geologic parameters relative to the formation along these wells to be determined. It may be for example the value of the average porosity of the reservoir, of the cumulative thickness of the lithofacies, etc.

A collection of seismic traces is also obtained, notably by means of conventional seismic prospecting surveys, by arranging at the surface seismic receivers $R_1 \ldots R_i \ldots R_m$, and by carrying out recordings with these receivers. This collection can also consist of seismic traces calculated from real or simulated well data, as it is known to specialists.

The method first comprises defining, on the traces of the collection, an analysis interval. It may be a time interval or a depth interval if the seismic data as a function of time are converted into data as a function of depth beforehand. This analysis interval is obtained for example by picking a zone of interest on the traces. If it is an oil reservoir, the position of the top and of the base of the reservoir are for example picked.

All the traces of the collection are thereafter characterized within this analysis interval, by a certain number p of seismic attributes which are obtained for example from the amplitudes of each seismic trace, from the amplitude of the analytic signal, which is representative, as it is well-known, of the energy of the trace, or by determining the amplitude spectrum of the traces, etc.

A set of traces RW1 ... RWi ... RWj ... RWn, which are either the seismic traces obtained in the neighbourhood of the well (or of each well) crossing the formation, or modelled traces corresponding to this neighborhood or to a simulated neighbourhood, is selected from the collection of traces available.

The method then comprises bringing together the geologic parameters obtained in the wells and the seismic attributes of the traces RW1 ... RWi ... RWn of the set of adjacent traces, so as to establish an empirical relation. A calibration population is thus formed with this set of traces associated with the wells, represented by the q geologic parameters and the p seismic attributes. It may be represented (FIG. 2) in a multivariable space of dimension (p+q) which is desired to be calibrated.

An optimum approximation $\hat{f}$ of the multivariable density function $f$ is then sought:

$$\hat{f}(G1 \ldots Gq, S1 \ldots Sp) f(G1 \ldots Gq, S1 \ldots Sp)$$

where

Gi=geologic parameter i, "i=1 ... q"

Sj=seismic attribute j, "j=1 ... p"

f=empirical density of the calibration population.

Figure 2:
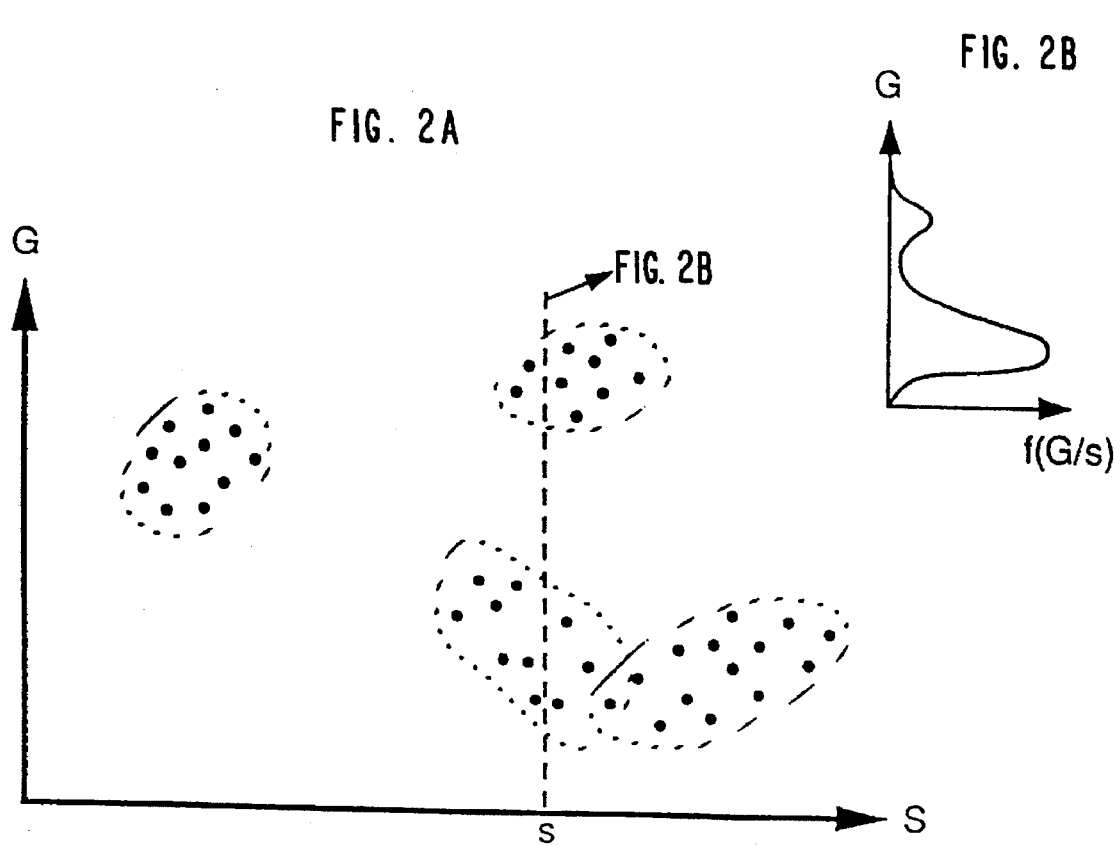
FIG. 2 illustrates the calibration methodology used in a diagram reduced to two dimensions for convenience sake, where S and G represent respectively the seismic attribute and the geologic variable considered.

This part constitutes the stage of calibration between the p seismic attributes and the q geologic parameters, and enables the empirical relation sought to be established by means of the approximate density function $\hat{f}$ and of the associated conditional density function $\hat{f}(G/s)$ (FIG. 2).

An empirical relation being established through this calibration stage, it is used to infer the value of the geologic parameters G1 ... Gq which can be associated with values of the seismic attributes S1=s1 ... Sp=sp, calculated on the seismic traces of the collection non-adjacent to the wells. This stage is performed by calculating the conditional density function of (G1 ... Gq), (S1=s1 ... sp) being known:

$$\hat{f}(G_1 \ldots G_q/S_1 = s_1 \ldots S_p = s_p) =$$

$$\frac{\hat{f}(G_1 \ldots G_q, S_1 = s_1 \ldots S_p = s_p)}{\hat{f}(S_1 \ldots S_p = s_p)} \text{ by definition.}$$

It is then possible to select, as a prediction of the geologic parameters (G1 ... Gq) for the known values $s_1 \ldots s_p$ of the seismic attributes, different characteristics of this conditional density function $$\hat{f}(G_1, \ldots G_q/S_1 = s_1 \ldots S_p = s_p),$$

such as mean value, mode, quantiles, etc. The distribution of $(G_1 \ldots G_q)$ for said values $(s_1 \ldots s_p)$ being entirely known, the uncertainties associated with the value predicted for $(G_1 \ldots G_q)$ can also be quantified.

In particular, it is obvious to specialists that the knowledge of the distribution $(G_1 \ldots G_q)$ for said values $(s_1 \ldots s_p)$ also enables the performing of random samplings of values of the geologic parameters conditioned by the seismic attributes, which is another way to represent the prediction uncertainty.

It can finally be seen that, at any point of a formation such as an oil field, where previously acquired seismic data are available, the method according to the invention enables inferring associated values of geologic parameters and the uncertainties linked to these values. The method thus allows geologic formations conditioned by seismic information to be estimated or simulated.

According to a particular embodiment, the sought approximation to the empirical density function is obtained in the form of a combination of densities associated with multivariable Gaussian laws as described for example in Royer, 1988, New approaches to the recognition of anomalies in exploration geochemistry, in quantitative analysis of mineral and energy resources, Chung et al., Reidel Publishing Company, 89–112.

In this case, function $\hat{f}$ is expressed in the form of a sum of density functions $f_k$:

$$\hat{f}(G_1 \ldots G_q, S_1 \ldots S_p) = \sum_{k=1}^{K} p_k f_k(G_1 \ldots G_q, S_1 \ldots S_p)$$

where $G_i$=geologic parameter i, "i=1 ... q", $S_j$=seismic attribute j, "j=1 ... p", $\hat{f}$=approximate density of the calibration population, K=number of subpopulations obtained with the Gaussian decomposition, $p_k$=weight of the subpopulation k, "k=1 ... K".

$f_k$=Gaussian density of the subpopulation k, "k=1 ... K".

$$f_x(X) = \frac{1}{(2\pi)^{r/2}|\Sigma_x|^{1/2}} \cdot \exp\left[ -\frac{1}{2} (X-\bar{X})\Sigma_x^{-1}(X-\bar{X}) \right]$$

where r=p+q,

X=vector of the geologic parameters and of the seismic attributes (X=[$X_1, \ldots X_r$]), $\bar{X}$=mean value of the geologic parameters and of the seismic attributes for the subpopulation, $\Sigma_x$=variance-covariance matrix associated to the subpopulation k.

In this case, the conditional density function of ($G_1 \ldots G_q$), knowing that ($S_1=s_1, S_2=s_2, \ldots S_p=s_p$), is written:

well to another; they are essentially conditioned by the lithologic nature of the reservoir (sandstones of high porosity or less porous dolomites).

The well data available were core samples taken in several wells, raw logging measurements taken in all the wells and those obtained by a combined interpretation of these measurements in terms of lithofacies with six major lithofacies:

shaly seals,
dolomicrites,
dolomitic reservoirs,
sandstone reservoirs,
vuggy dolomites,
anhydritic seals.

Knowledge of the spatial distribution of the different lithofacies is of great importance since it conditions the petrophysical properties of the reservoir. This is the reason why each well is characterized in this case study or example at the level of the reservoir by the cumulative thicknesses (of the whole of the formation studied) of the six lithofacies. These six parameters were in this case the geologic parameters to be calibrated with the seismic attributes.

The reservoir top has been picked on the seismic data available in the field (22 seismic profiles with 500 m between lines, 17 m between reflection points, with a sampling interval of 4 ms in two-way travel time) after an adjustment between the time scale and the depth scale achieved at the level of the wells.

From the top of the reservoir, a time interval or seismic time window of constant size (32 ms in two-way time) has been analyzed, which corresponds thus to the depth interval at the level of the productive series. The portions of seismic traces defined thereby have been characterized by linear combinations of the initial amplitudes, which are four in number, and which thus constitute the seismic attributes to be calibrated with the geologic parameters.

The calibration population selected included the geologic data associated with the different wells of the field and, for each well, the closest three seismic traces (such as RWi ... RWn, etc., FIG. 1).

The method according to the invention has been used to predict the cumulative thickness of the "sandstone reservoirs" lithology between the wells, which was the most interesting parameter for determining the petrophysical behaviour of the reservoir. The calibration population has $$\hat{f}(G_1, \ldots G_q/S_1=s_1 \ldots S_p=s_p) = \frac{\sum_{k=1}^{K} p_k f_k(G_1 \ldots G_q, S_1=s_1 \ldots S_p=s_p)}{\sum_{k=1}^{K} p_k f_k(S_1=s_1 \ldots S_p=s_p)}$$

$$= \frac{\sum_{k=1}^{K} p_k f_k(G_1 \ldots G_q, S_1=s_1 \ldots S_p=s_p)}{\sum_{k=1}^{K} p_k \left[ \int_{g_1} \ldots \int_{g_q} f_k(G_1=g_1 \ldots G_q=g_q, S_1=s_1 \ldots S_p=s_p) dg_q \ldots dg_1 \right]}$$

The validity of the method according to the invention has been tested notably on a 70-m thick oil reservoir containing liquid hydrocarbons, developed with about sixty wells and covered by dense grid 2D surface seismic prospecting operations.

The productive levels correspond to sandstones, dolomitic sandstones and vuggy dolomites separated by seal levels of shale, anhydritic shale and dolomicrite type. The petrophysical characteristics of the reservoirs vary greatly from one thus been represented in a space of dimension 5 (defined by the cumulative thickness of the sandstone lithofacies and the four seismic attributes), where an approximation to the multivariable density function by the sum of Gaussian density functions has been sought. As shown in the diagram of FIG. 4, the relation between the geologic parameter and the seismic attributes is far from being linear.

The calibration population has been split up into six Gaussian classes, which allowed the multivariable probability density of the calibration population to be approximated with the formula as follows:

$$\hat{f}(x) = \sum_{k=1}^{6} p_k f_k(x)$$

$$où\ f_k(x) = \frac{1}{(2\pi)^{5/2}|\Sigma_x|^{1/2}} \exp\left[-\frac{1}{2}(x-\bar{x})'\Sigma_x^{-1}(x-\bar{x})\right]$$

Figure 3:
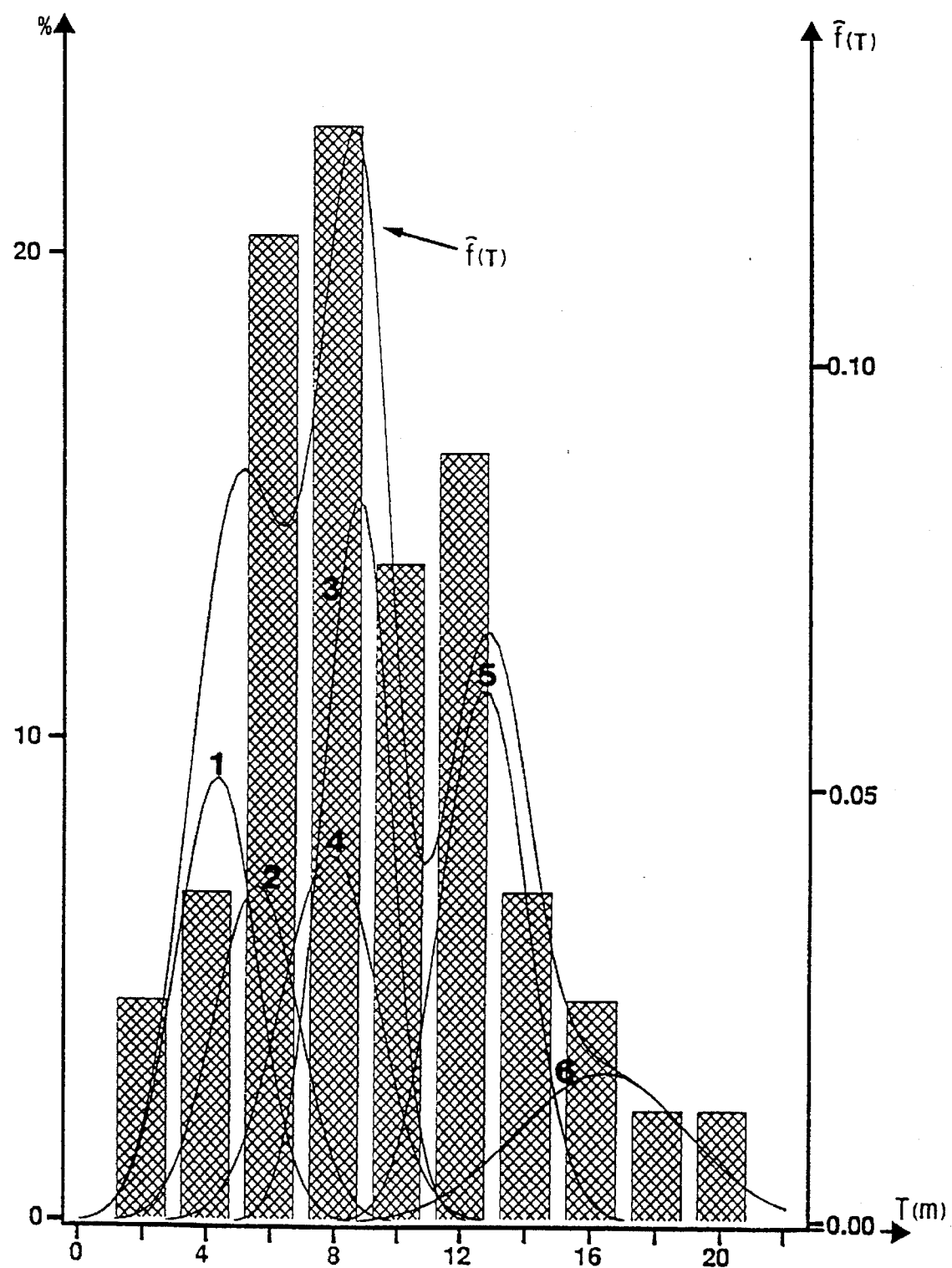
FIG. 3 shows the histogram of a geologic parameter such as the sandstone thickness T of a formation surveyed, and superposed, the marginal distribution of the approximation $\hat{f}(T)$ and its six Gaussian components numbered from 1 to 6.

It can be seen in particular in FIG. 3 that the approximation quality is satisfactory. Seeking this optimum approximation constitutes the calibration stage.

It has been possible to calculate the density function of the geologic parameter, conditioned by the values of the seismic attributes, from the expression of the approximation to the multivariable probability density, which amounted to predicting the distribution of the geologic parameter, the seismic attributes being known. The predicted distribution of the sandstone thickness in relation to the seismic attributes is shown in FIGS. 5A to 5D for some wells.

Figure 6:
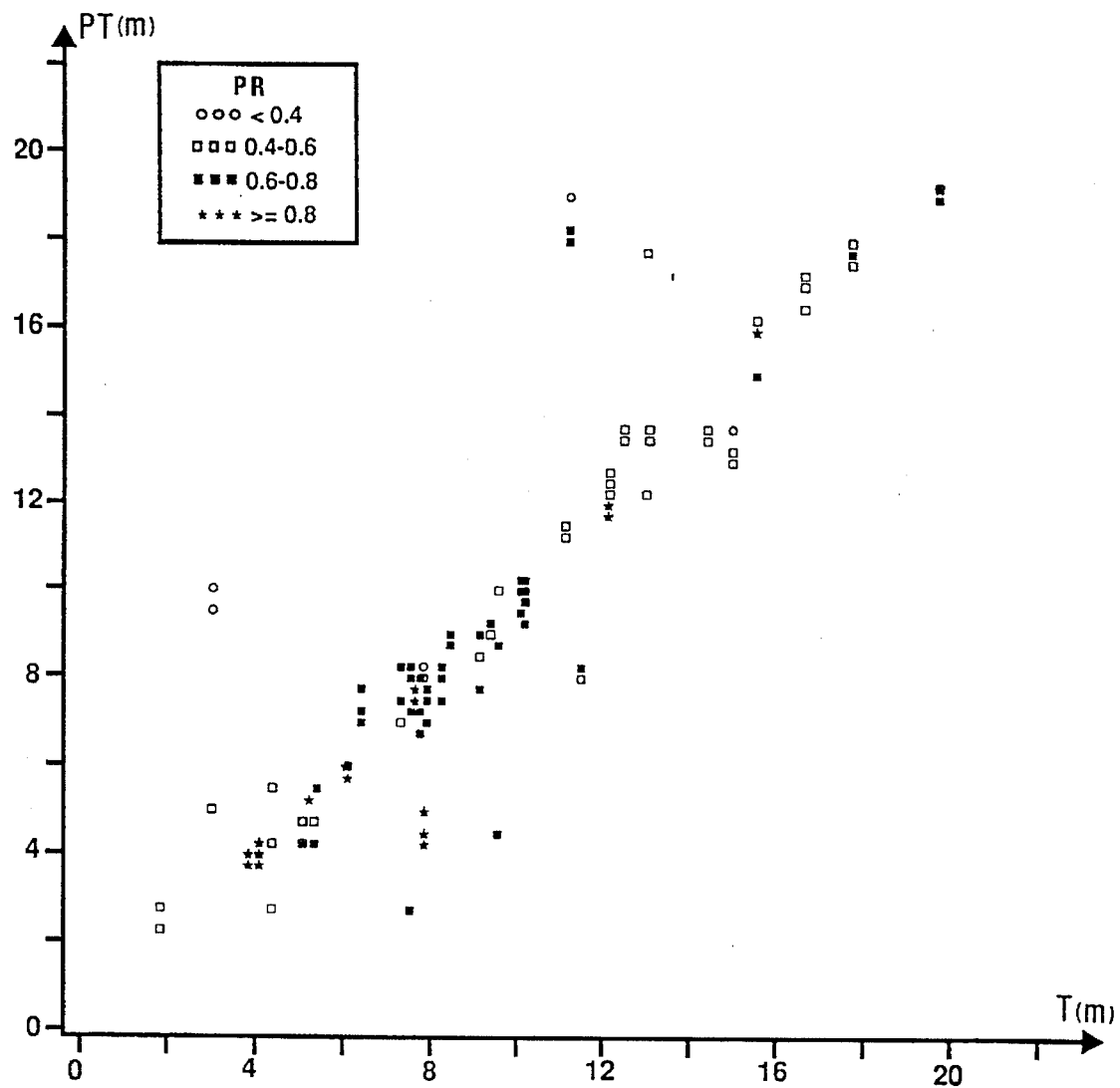
FIG. 6 shows a diagram of the predicted sandstone thicknesses PT, as a function of the actual sandstone thicknesses, by applying the method to the formation tested, the points being coded by the probability PR of obtaining the predicted thickness PT.

The predicted value can be characterized by conventional statistical parameters such as the distribution mode (the most probable value), the mean value, the quartiles, etc. It should be noted that, for most of the wells of the calibration population, the mode of the predicted distribution is very close to the actual value of the sandstone thickness (See FIG. 6). Since the distribution is entirely known, the uncertainty linked to the prediction can be quantified by different measurements, such as the standard deviation or the interquartile interval.

Figure 7A:
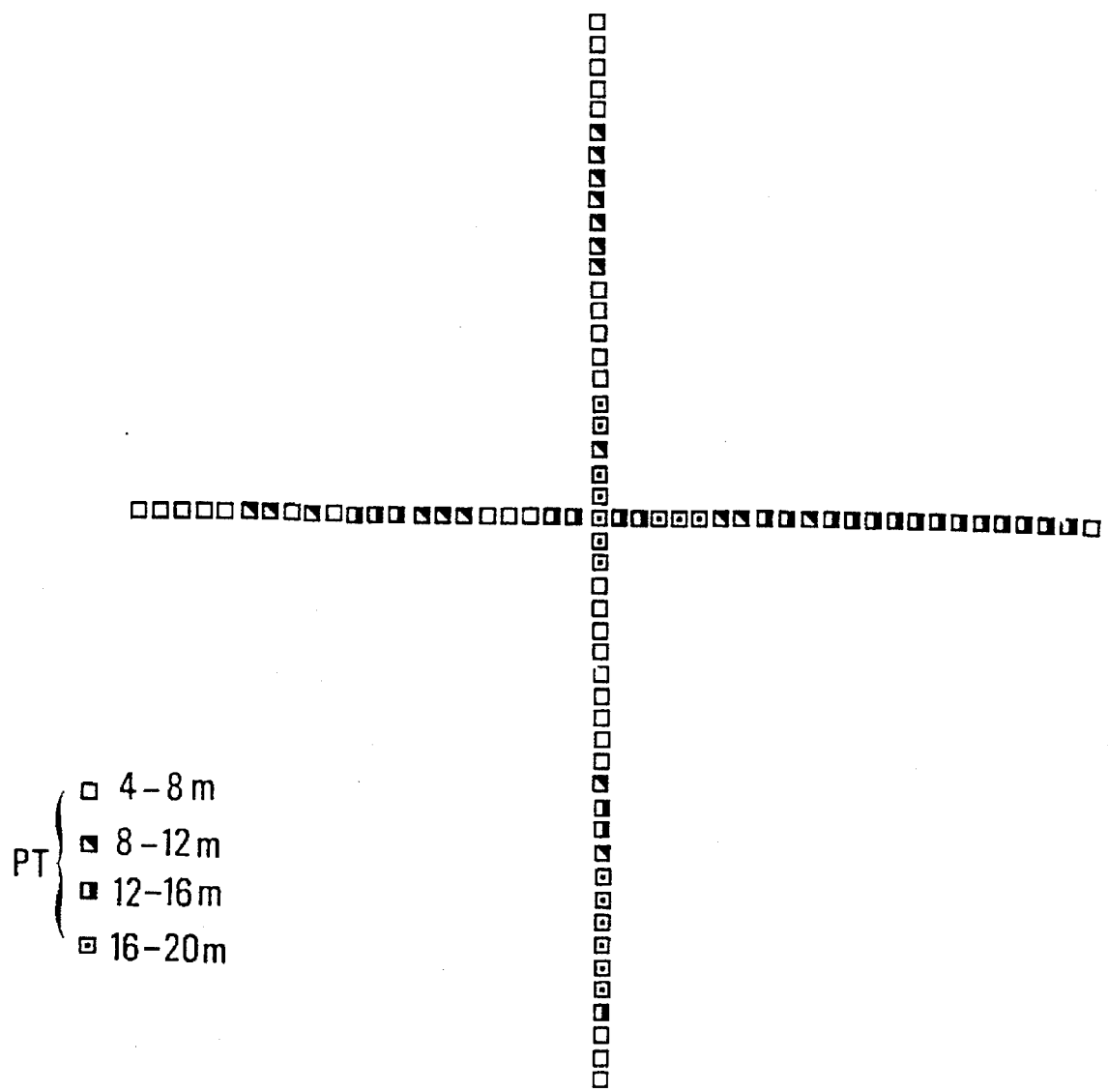

This calibration process has thereafter been applied to the whole of the seismic traces obtained at the end of the 2D seismic survey performed in the field, allowing the possible thickness of the sandstones of the formation between the wells to be mapped with a dense grid spacing (that obtained by seismic prospecting). In the map of FIG. 7, the estimated value is that of the distribution mode. This map completes the knowledge of the reservoir given by the wells only, enabling new wells to be established in the most favourable zones (with a high sandstone cumulative thickness), and also providing a complementary description of the geologic characteristics of the reservoir which are to be taken into account for the development of the reservoir model.

We claim:

1. A seismic data analysis method for predicting geologic parameters of an underground formation from geologic information obtained by measurings or analyses performed in at least one well crossing the formation and from a collection of seismic traces obtained through the seismic exploration of the formation, the collection including a set of seismic traces obtained adjacent the wells, wherein an analysis interval is defined as a function of one of time or depth on the seismic traces at the level of the underground formation, compatible with a configuration of the formation, portions of the seismic traces being characterized within the analysis interval by a set of p seismic attributes, a certain number q geologic parameters being deducible from the obtained geologic information, and forming a calibration population, having points with which the p seismic attributes are linked to the seismic traces of the set of seismic traces and the q geologic parameters, the method comprising:

performing a statistical calibration on the calibration population of points in a p+q dimensional space of representation, by seeking an approximation of a multivariable density function relative to the calibration population so as to establish an empirical relation between the number of geologic parameters and the set of p seismic attributes; and applying the empirical relation to the seismic traces of the collection, other than the set of seismic traces, so as to predict the q corresponding geologic parameters associated with the seismic attributes of the seismic traces other than the set of seismic traces, as well as any uncertainties about the predicted geologic parameters of the underground formation.

2. A method as claimed in claim 1, wherein the prediction of the geologic parameters is an estimation of the parameters.

3. A method as claimed in claim 1, wherein the prediction of the geologic parameters is a simulation of the parameters in order to represent any uncertainties.

4. A method as claimed in claims 1, wherein said statistical calibration comprises a determination of an optimum approximation to the multivariable probability density function of the calibration population by a finite sum of multivariable probability densities, belonging to a determined family of probability laws, and the use of this approximation for calibration purposes.

5. A method as claimed in claim 4, wherein a family of Gaussian laws is selected to determine the optimum approximation.

6. A method as claimed in claim 4, wherein said formation is a reservoir containing petroleum effluent, the analysis interval being defined by picking a top and a base of the reservoir on the seismic traces.

7. A method as claimed in claim 1, wherein the seismic attributes are obtained from the amplitudes of each portion of seismic trace of the set.

8. A method as claimed in claim 1, wherein the seismic attributes are obtained from an amplitude of an analytic signal.

9. A method as claimed in claim 1, wherein the seismic attributes are obtained by determining an amplitude spectrum of the portions of the seismic traces.

10. A method as claimed in claim 1, wherein the geologic parameters are obtained by analyzing samples taken in the wells.

11. A method as claimed in claim 1, wherein the geologic parameters are obtained by analyzing logs recorded by means of tools in the at least one well.

12. A method as claimed in claim 1, wherein a mean porosity of the samples is taken as a geologic parameter.

13. A method as claimed in claim 1, wherein the seismic traces are obtained through the seismic exploration of the formation.

14. A method as claimed in claim 1, wherein at least a part of the seismic traces are obtained through use of receivers.

15. A method as claimed in claim 1, wherein at least a part of the seismic traces are calculated from well data.

* * * * *